United States Patent
Lin et al.

(10) Patent No.: US 7,499,294 B2
(45) Date of Patent: Mar. 3, 2009

(54) SELF-EXCITATION SYNCHRONOUS RECTIFICATION DRIVER

(75) Inventors: Kuo-Fan Lin, Taoyuan Hsien (TW); Chien-Li Tsai, Taoyuan Hsien (TW)

(73) Assignee: SPI Electronic Co., Ltd., Taoyuan Hsien (TW)

( * ) Notice: Subject to any disclaimer, the term of this patent is extended or adjusted under 35 U.S.C. 154(b) by 193 days.

(21) Appl. No.: 11/705,135

(22) Filed: Feb. 12, 2007

(65) Prior Publication Data

US 2008/0192517 A1      Aug. 14, 2008

(51) Int. Cl.
*H02M 3/335* (2006.01)
(52) U.S. Cl. .................................................. 363/21.06
(58) Field of Classification Search .............. 363/21.01, 363/21.04–21.07, 21.14, 56.01, 56.11, 127
See application file for complete search history.

(56) References Cited

U.S. PATENT DOCUMENTS

| | | | |
|---|---|---|---|
| 5,774,350 A * | 6/1998 | Notaro et al. .................. | 363/89 |
| 6,583,993 B2 * | 6/2003 | Hua .......................... | 363/21.06 |
| 6,674,658 B2 * | 1/2004 | Mao et al. .................... | 363/127 |
| 6,845,018 B2 * | 1/2005 | Ohishi ...................... | 363/21.06 |
| 7,224,590 B2 * | 5/2007 | Lin .......................... | 363/21.06 |
| 7,304,868 B2 * | 12/2007 | Aso et al. ................. | 363/21.06 |
| 2002/0097588 A1 | 7/2002 | Priegnitz et al. | |
| 2002/0196002 A1 | 12/2002 | Diallo et al. | |
| 2005/0047177 A1 | 3/2005 | Tobita | |
| 2006/0018133 A1 | 1/2006 | Hua | |

FOREIGN PATENT DOCUMENTS

TW        093203328 U        12/2004

* cited by examiner

*Primary Examiner*—Matthew V Nguyen
(74) *Attorney, Agent, or Firm*—Muncy, Geissler, Olds & Lowe, PLLC

(57) ABSTRACT

The present invention discloses a self-excitation synchronous rectification driver, which comprises a self-excitation coil, a self-excitation driver, a synchronous-signal source, a pulse transformer, a positive/negative edge detector, and a latch unit. The synchronous-signal source generates a synchronous signal to attain an external synchronous function. When the frequency is abnormal, the first and second rectifier switches of the rectification unit of the power supply are forced to turn on or turn off. Thereby, the first and second rectifier switches can turn on alternately, and the first and second rectifier switches are limited to within the highest and lowest working frequencies during the zero-load stage or the shutdown stage. Thus, the frequency of the synchronous rectification driver is under control, and abnormal voltage will not occur.

10 Claims, 5 Drawing Sheets

SELF-EXCITATION SYNCHRONOUS RECTIFICATION DRIVER

FIELD OF THE INVENTION

The present invention relates to a self-excitation rectification driver, particularly to a rectification driver, which utilizes synchronous signals to make two rectifier switches turn on alternately and limit the working frequencies thereof.

BACKGROUND OF THE INVENTION

A power supply usually comprises a main power system and a standby power system. By a main transformer, the main power system is divided into a power driver unit at the primary side and a rectification unit at the secondary side. The rear end of the rectification unit is coupled to a voltage feedback unit 6 to correct the working period of the power driver unit. Refer to FIG. 1 for the circuit architecture of a conventional power supply. In the conventional power supply shown in FIG. 1, the power driver unit has a primary driver unit SW1, a secondary driver unit SW2 and a main transformer TX1. The rectification unit utilizes a self-excitation coil Lo to generate a self-excitation phenomenon. The charge/discharge of the self-excitation coil Lo is used to control the turn-on of a first rectifier switch and a second rectifier switch. For example, a R.O.C. patent application No.093203328 "Forward-Type Power Supply with Self-Excitation Synchronous Rectification Circuit" has a self-excitation coil and a self-excitation driver for the self-excitation coil inside the rectification unit at the secondary side of its main transformer. Further, four US patent Publication Nos. 20020097588, 20020196002, 20050047177 and 20060018133 also utilize self-excitation technologies for power transformation. Therefore, self-excitation synchronous rectification technologies have been widely used in forward-type power transformation devices. The sensed voltage of the main transformer is directly or indirectly used to drive the synchronous rectifier switch elements and achieve synchronous self-excitation in all the existing patents of self-excitation synchronous rectification technologies. Refer to FIG. 2 for the waveforms of the conventional power supply circuit shown in FIG. 1. In conventional power supplies, when the load varies abruptly, the self-excitation frequency will be out of control, which will results in abnormal voltage and damage. The conventional self-excitation technologies cannot achieve the external synchronous function via that the self-excitation coil senses the activities of the power driver unit at the primary side of the main transformer. Thus, the timings of the first and second rectifier switches cannot separate, and overlap loss occurs. When energy is recycled during the zero-load stage, the operation of the primary driver switch of the power driver unit stops; thus, an abnormally low self-excitation frequency and a surge voltage 5 appear. Besides, during the underload-shutdown stage, the secondary side of the main transformer still has unreleased energy with the power driver unit at the primary side having been turned off, and the voltage is thus out of control. Therefore, in the conventional self-excitation technologies, the self-excitation frequency of the rectification unit is likely to get out of control during the underload-shutdown stage or the zero-load stage. Obviously, the art needs a mechanism to regulate the self-excitation frequency.

SUMMARY OF THE INVENTION

The primary objective of the present invention is to provide a self-excitation rectification driver with an external synchronous function, wherein during the zero-load or underload-shutdown stage, an external synchronous signal regulates the self-excitation frequency to be within a normal working range lest the circuit be damaged by abnormal voltage.

The present invention proposes a self-excitation synchronous rectification driver, which utilizes a synchronous signal to implement an external synchronous function and make a first rectifier switch and a second rectifier switch turn on alternately lest the turn-on timings thereof overlap. The synchronous signal limits the working frequencies of the first and second rectifier switches to between the maximum and minimum values during the turn-off or zero-load stage. The self-excitation synchronous rectification driver of the present invention comprises a self-excitation coil, a self-excitation driver, a synchronous-signal source, a pulse transformer, a positive/negative edge detector and a latch unit. The self-excitation coil and the self-excitation driver generate self-excitation frequencies. The pulse transformer obtains a synchronous signal from the synchronous-signal source. The positive/negative edge detector detects the positive/negative edge of the synchronous signal and triggers the latch unit to compulsively turn on or turn off the first and second rectifier switches when the frequency is too high or too low. Thus, there is a limit of the minimum frequency. Further, the latch unit has a period-limiting circuit to limit the highest frequency during the underload-shutdown stage lest the frequency of the synchronous rectification driver get out of control and abnormal voltage occur.

DETAILED DESCRIPTION OF THE PREFERRED EMBODIMENTS

Figure 1:
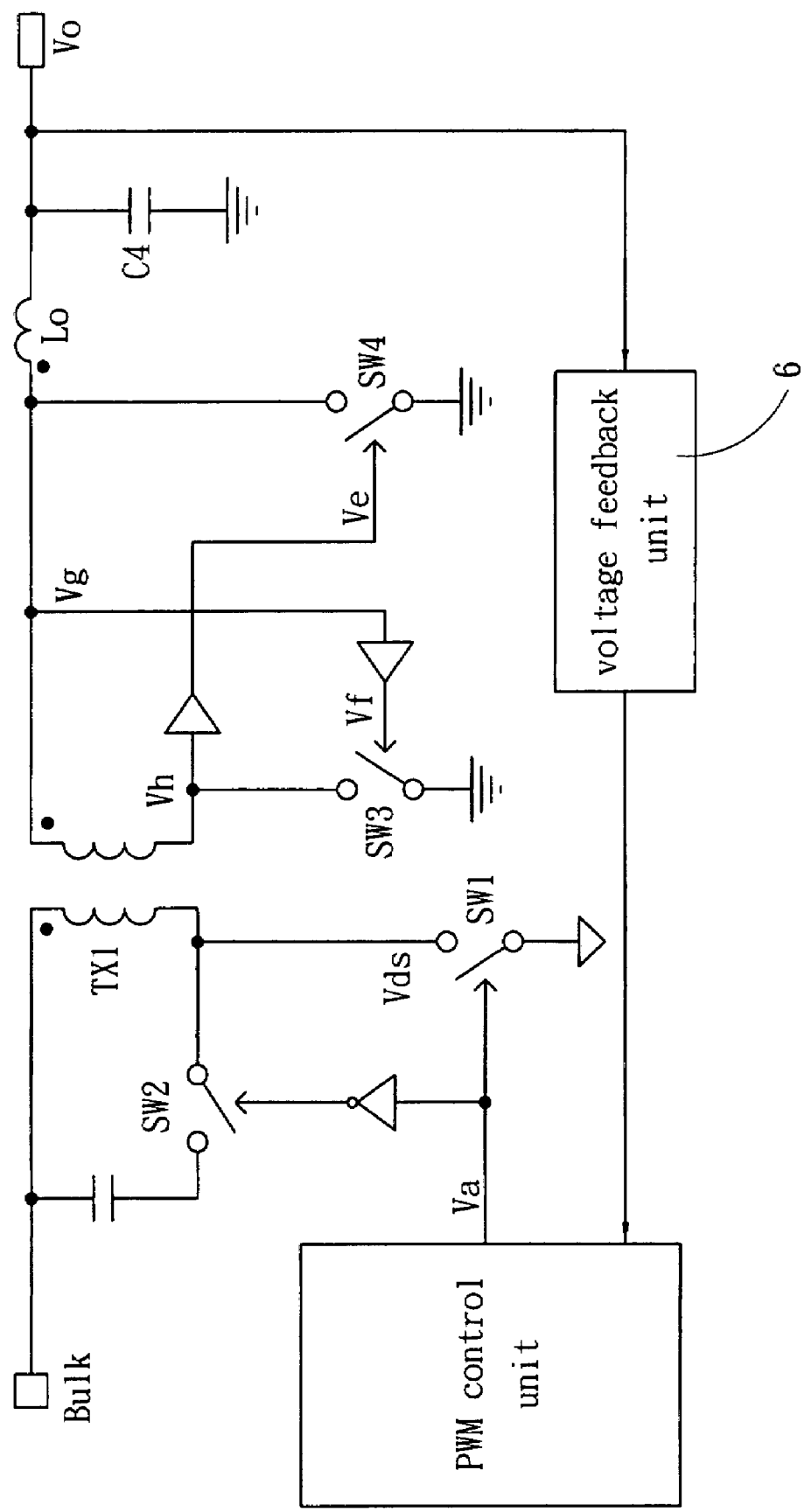
FIG. 1 is a diagram showing the architecture of the rectification circuit of a conventional power supply.
Figure 2:
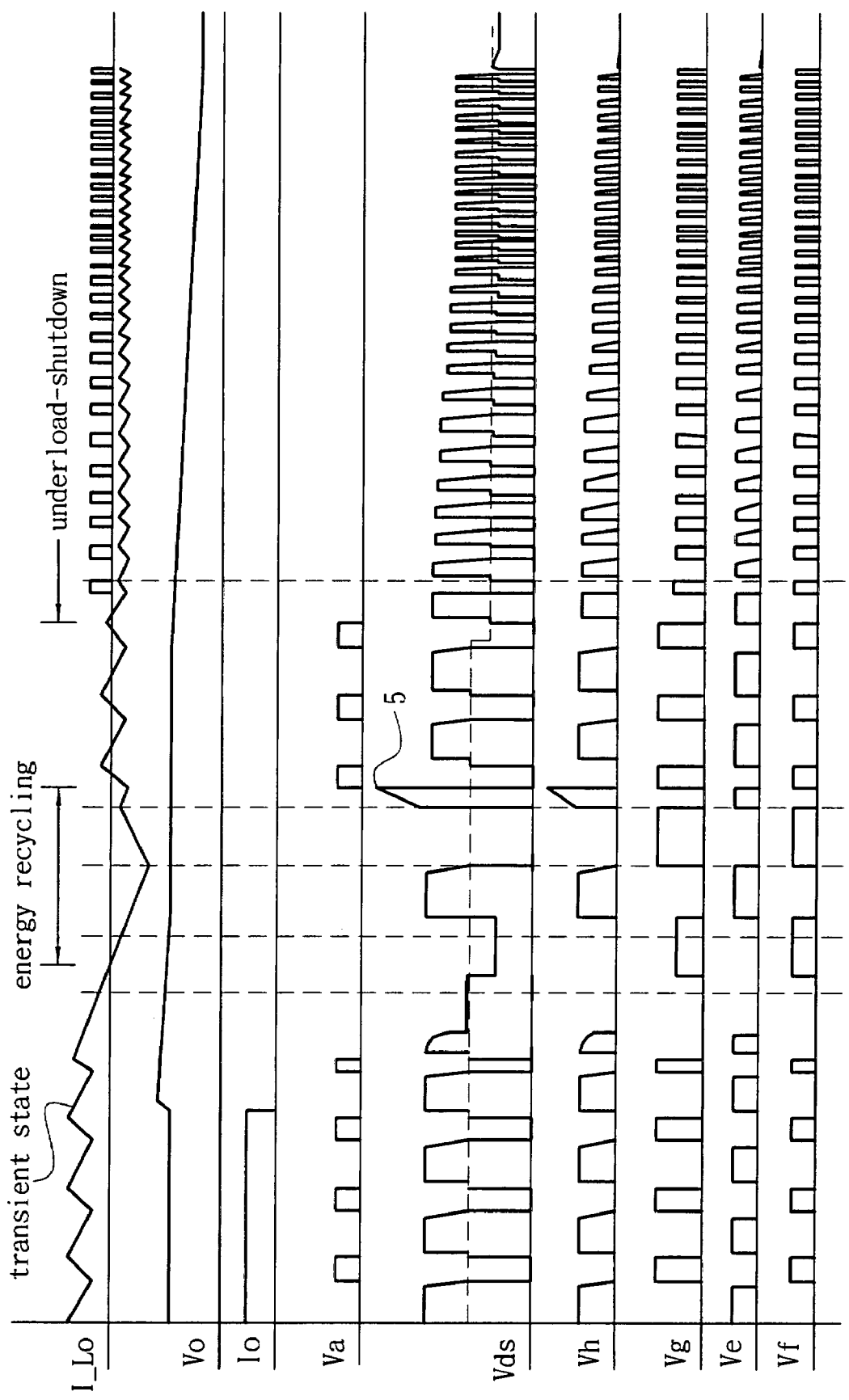
FIG. 2 is a diagram showing the waveforms of the rectification circuit of a conventional power supply.
Figure 3:
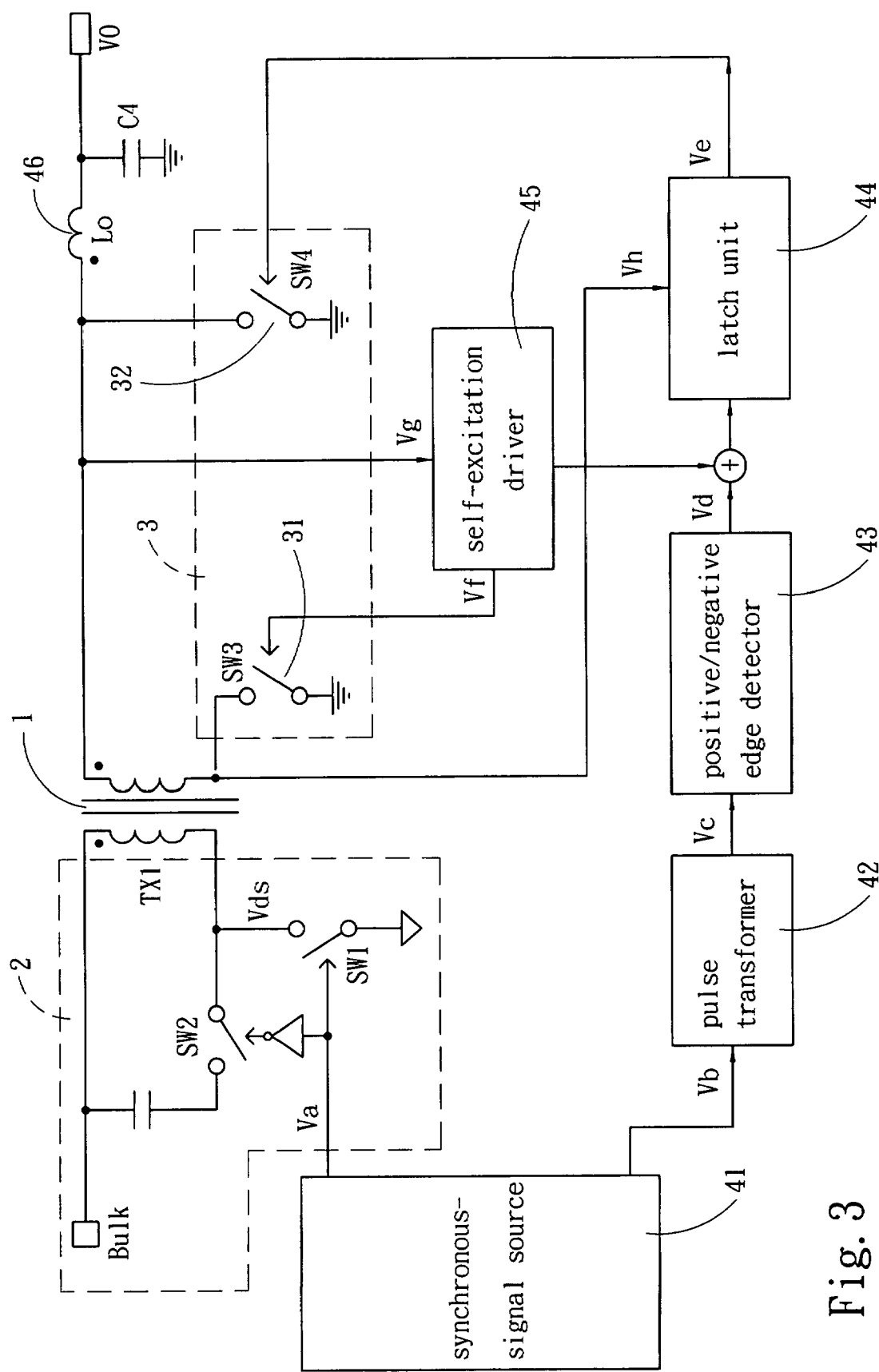
FIG. 3 is a diagram schematically showing the circuit architecture according to the present invention.

The present invention is a self-excitation synchronous rectification driver, which applies to a power supply. The power supply comprises a main transformer 1. The main transformer 1 further comprises a power driver unit 2 at the primary side and a rectification unit 3 at the secondary side. The power driver unit 2 has a primary driver switch SW1 and a secondary driver switch SW2. The rectification unit 3 has a first rectifier switch 31 and a second rectifier switch 32. The first and second rectifier switches 31 and 32 are controlled by the self-excitation synchronous rectification driver of the present invention. The self-excitation synchronous rectification driver of the present invention comprises a self-excitation coil 46, a self-excitation driver 45 used to drive the first rectifier switch 31, a synchronous-signal source 41 generating a synchronous signal, a pulse transformer 42, a positive/negative edge detector 43 used to detect the positive/negative edge of the synchronous signal, and a latch unit 44 triggered by the positive/negative edge of the synchronous signal to control the turn-on/turn-off of the second rectifier switch 32. When the frequency is too high or too low, the synchronous signal forces the first and second rectifier switches 31 and 32 to turn on or turn off, and the limits of the maximum period and the minimum period are thus formed. Refer to FIG. 3 a block diagram schematically showing the circuit architecture according to the present invention. The primary side of the main transformer 1 has the power driver unit 2 with the primary driver switch SW1 and the secondary driver switch SW2. The secondary side of the main transformer 1 has the rectification unit 3 with the first rectifier switch 31 and the second rectifier switch 32. The first rectifier switch 31 and the second rectifier switch 32 are respectively controlled by the self-excitation driver 45 and the latch unit 44. The self-excitation driver 45 is a latch circuit capable of stably outputting a high-level signal or a low-level signal. The latch unit 44 is triggered by the positive/negative edge of the synchronous signal generated by the synchronous-signal source 41. The synchronous signal synchronizes the first and second rectifier switches 31 and 32 with the power driver unit 2. The synchronous signal is transmitted via the pulse transformer 42 to the positive/negative edge detector 43. The positive/negative edge detector 43 detects the positive edge or negative edge of the synchronous signal and generates a high-level output signal or a low-level output signal. The positive/negative edge detector 43 is coupled to the latch unit 44. The positive/negative edge detector 43 drives the latch unit 44 to change the output signal when the positive/negative edge detector 43 is triggered by the synchronous signal. When the latch unit 44 changes the output signal, it forces the second rectifier switch 32 to turn on or turn off, and the first rectifier switch 31 then responds to the operation of the second rectifier switch 32, and a limit of the working period is thus formed. When the frequency is normal, the first rectifier switch 31 and the second rectifier switch 32 operate according to the working periods generated by the self-excitation coil 46 and the self-excitation driver 45. When the frequency abnormally varies, the operation is controlled by the period limit generated by the synchronous signal to maintain at within the highest frequency and the lowest frequency lest the frequency get out of control and abnormal voltage appear.

Figure 4:
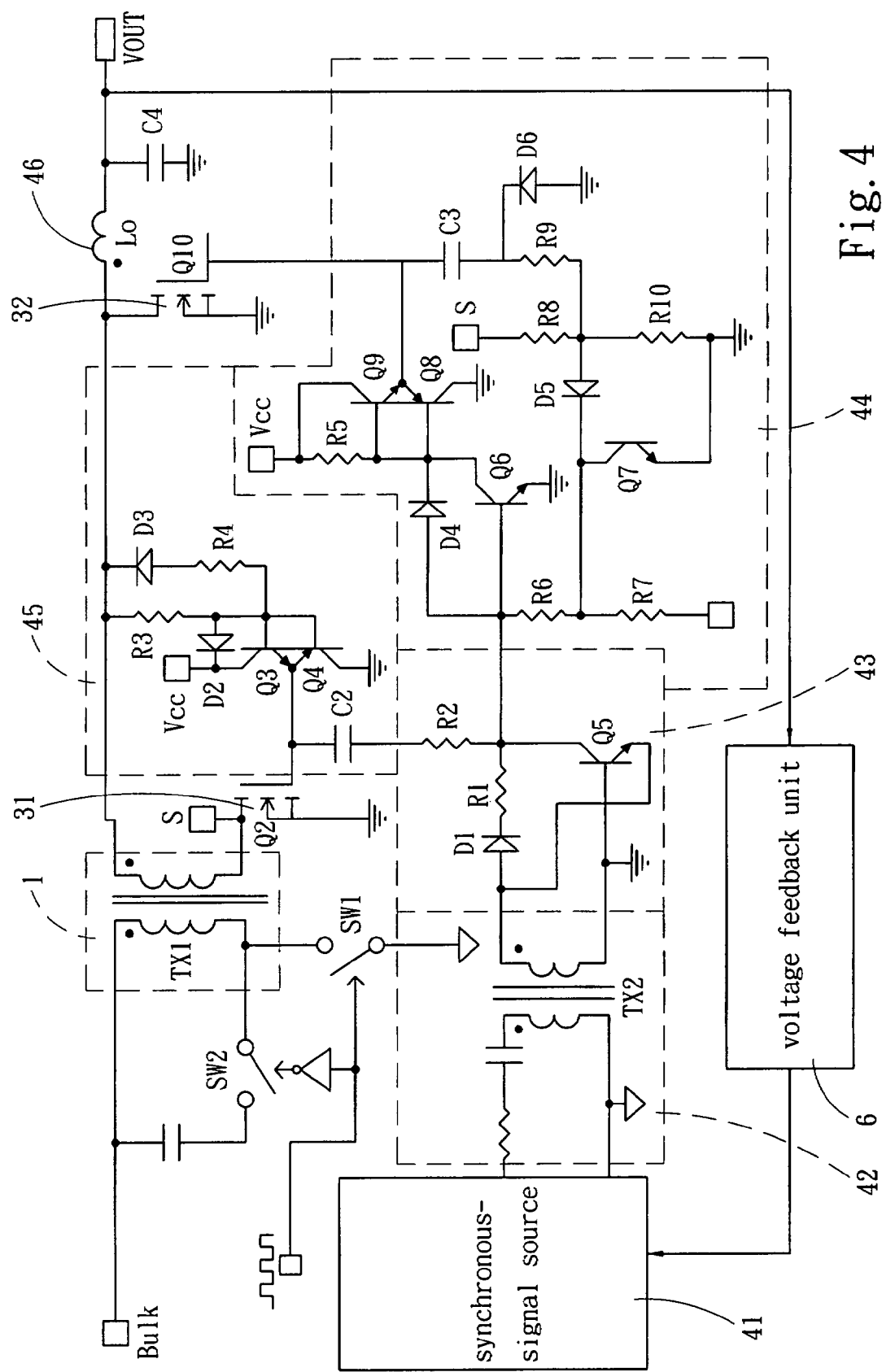
FIG. 4 is a diagram schematically showing a circuit implementing the present invention.
Figure 5:
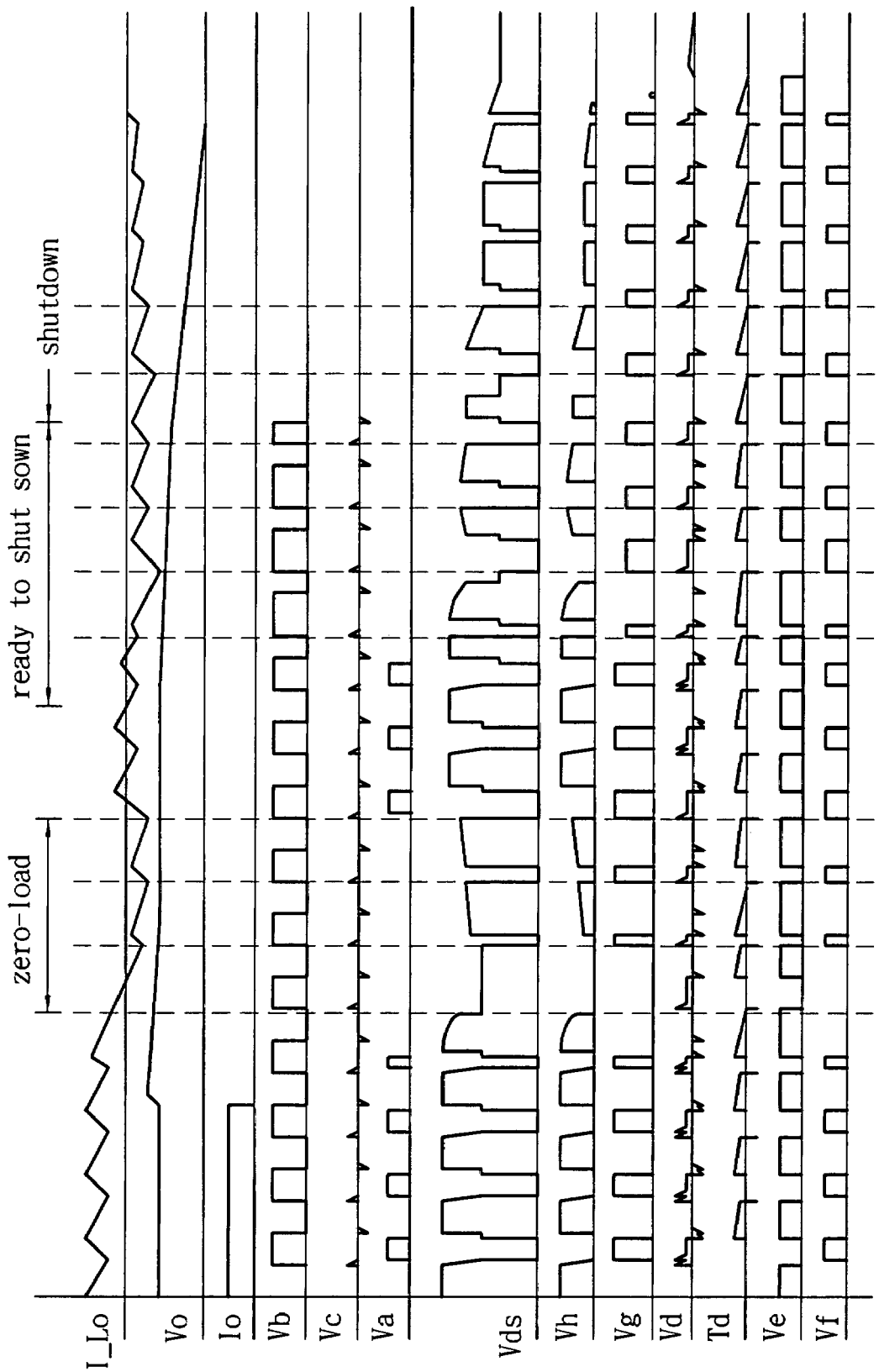
FIG. 5 is a diagram showing the waveforms of a circuit implementing the present invention.

Refer to FIG. 4 and FIG. 5 respectively a diagram schematically showing a circuit implementing the present invention and a diagram showing the waveforms of a circuit implementing the present invention. When the load does not vary greatly and the frequency is stable, the self-excitation coil 46 and the self-excitation driver 45 generate the self-excitation phenomenon according to the activities of the power driver unit 2 at the primary side of the main transformer 1 to control the first and second rectifier switches 31 and 32 to turn on alternately. The self-excitation driver 45 comprises a diode D3, resistors R3 and R4, and transistors Q3 and Q4. A synchronous signal is generated by the synchronous-signal source 41 and transmitted via the pulse transformer 42 to the self-excitation synchronous rectification driver at the secondary side of the main transformer 1. The positive/negative edge detector 43, which comprises a diode D1, a capacitor C2, a transistor Q5 and resistors R1 and R2, detects the synchronous signal and then triggers the succeeding latch unit 44. The latch unit 44 comprises a capacitor C3, diodes D4, D5 and D6, transistors Q6, Q7, Q8 and Q9, and resistors R5, R6, R7, R8, R9 and R10, wherein the transistors Q6, Q7, Q8 and Q9 form a latch circuit. The positive edge of the synchronous signal makes the transistors Q6 and Q8 turn on and the transistor Q9 turn off and thus forces the second rectifier switch 32 to turn off. The negative edge of the synchronous signal makes the transistors Q6 and Q8 turn off and the transistor Q9 turn on and thus forces the second rectifier switch 32 to turn on. Thus, the self-excitation driver 45, which controls the first rectifier switch 31, is also coupled to the positive/negative edge detector 43, and the working period of the self-excitation driver 45 is also limited by the positive/negative edge of the synchronous signal. Thereby, the first and second rectifier switches 31 and 32 are alternately turned on and limited by the lowest working frequency lest the frequency be too low during the zero-load stage. The latch unit 44 has a period-limiting circuit generating a time constant. The period-limiting circuit is a charge/discharge circuit and comprises the capacitor C3, the diode D5, the transistor Q7, and the resistors R8, R9 and R10. The period-limiting circuit utilizes the charge/discharge time of the capacitor and the resistors to form a time constant. When none synchronous signal exists during the underload-shutdown stage, the power driver unit 2 at the primary side of the main transformer 1 stops operation, and the self-excitation frequency begins to vary abnormally, and the period-limiting circuit then controls the turn-on/turn-off period of the second rectifier switch 32 via the time constant of the capacitor C3 and the resistor R9; thus, the working period and frequency of the first and second rectifier switches 31 and 32 are limited to within the predetermined ranges. Then, the frequency of the rectification unit 3 will be under control in any case, and abnormal voltage will not occur.

In the aforementioned preferred embodiments of the present invention, the synchronous-signal source 41 may be implemented by a PWM (Pulse Width Modulation) control unit. The PWM control unit receives the feedback signal generated by a voltage feedback unit 6 to modify the working period of the power driver unit 2. Thereby, the synchronous-signal source 41 can simultaneously generate the working period for the power driver unit 2 and the synchronous signal for the power driver unit 2 and the rectification unit 3.

Those described above are the preferred embodiments to exemplify the present invention. However, it is not intended to limit the scope of the present invention. Any equivalent modification or variation made the persons skilled in the art according to the spirit of the present invention is to be also included within the scope of the present invention, which depends on the claims stated below.

In summary, the efficacies of the present invention have been described above; in comparison with the conventional technologies, the present invention fully possesses novelty and non-obviousness and meets the requirements for a patent. Thus, the Inventors file the application. It will be greatly appreciated if the application is approved fast.

What is claimed is:

1. A self-excitation synchronous rectification driver, applying to a power supply that comprises a main transformer having a power driver unit at the primary side and a rectification unit at the secondary side with said rectification unit having a first rectifier switch and a second rectifier switch both controlled by said self-excitation synchronous rectification driver, comprising the following components:

a self-excitation coil and a self-excitation driver, wherein the turn-on/turn-off of said second rectifier switch makes said self-excitation coil charge/discharge and trigger said self-excitation driver to turn on or turn off said first rectifier switch;

a synchronous-signal source outputting a synchronous signal to synchronize said rectification unit with said power driver unit;

a pulse transformer receiving said synchronous signal and coupled to a positive/negative edge detector, wherein said positive/negative edge detector detects the positive edge and negative edge of said synchronous signal; and a latch unit having a period-limiting circuit, coupled to said positive/negative edge detector, outputting a high-level signal or low-level signal according to the positive edge or negative edge of said synchronous signal to control the turn-on/turn-off of said second rectifier switch, wherein when there is none said synchronous signal, said latch unit receives a time constant generated by said period-limiting circuit to control the period of triggering the turn-on/turn-off of said second rectifier switch.

2. The self-excitation synchronous rectification driver according to claim 1, wherein said synchronous-signal source is a PWM (Pulse Width Modulation) control unit.

3. The self-excitation synchronous rectification driver according to claim 2, wherein said power supply further comprises a voltage feedback unit to modify the period output by said PWM control unit.

4. The self-excitation synchronous rectification driver according to claim 1, wherein said self-excitation driver is a latch circuit outputting a high-level or low-level signal stably, the output of said latch circuit is coupled to said first rectifier switch.

5. The self-excitation synchronous rectification driver according to claim 1, wherein said synchronous signal drives said latch unit to make said first rectifier switch and said second rectifier switch turn on alternately.

6. The self-excitation synchronous rectification driver according to claim 1, wherein the negative edge of said synchronous signal forces said first rectifier switch to turn off, and the limit of the maximum period of said first rectifier switch is thus formed.

7. The self-excitation synchronous rectification driver according to claim 1, wherein the positive edge of said synchronous signal forces said second rectifier switch to turn off, and the limit of the minimum period of said second rectifier switch is thus formed during the underload-shutdown stage.

8. The self-excitation synchronous rectification driver according to claim 1, wherein said latch unit comprises a latch circuit and a period-limiting circuit, and said latch circuit is coupled to said second rectifier switch.

9. The self-excitation synchronous rectification driver according to claim 8, wherein said period-limiting circuit is a charge/discharge circuit, and the discharge time thereof is used to form a time constant.

10. The self-excitation synchronous rectification driver according to claim 9, wherein said charge/discharge circuit comprises a capacitor and a resistor, and the electric relationship of said capacitor and said resistor is used to form said time constant.

* * * * *